(12) United States Patent
Hatakeyama et al.

(10) Patent No.: US 7,133,959 B2
(45) Date of Patent: Nov. 7, 2006

(54) DATA-DRIVEN INFORMATION PROCESSING DEVICE AND METHOD TO ACCESS MULTIPLE BANK MEMORIES ACCORDING TO MULTIPLE ADDRESSES

(75) Inventors: Kouichi Hatakeyama, Nara (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 229 days.

(21) Appl. No.: 10/320,555

(22) Filed: Dec. 17, 2002

(65) Prior Publication Data

US 2003/0120855 A1  Jun. 26, 2003

(30) Foreign Application Priority Data

Dec. 20, 2001 (JP) .............................. 2001-387194

(51) Int. Cl.
*G06F 12/04* (2006.01)
(52) U.S. Cl. ........................ 711/5; 709/245; 709/238
(58) Field of Classification Search .................. 711/5; 709/245, 238
See application file for complete search history.

(56) References Cited

U.S. PATENT DOCUMENTS

| 4,843,632 | A | * | 6/1989 | Lee et al. ..................... 382/233 |
| 5,454,115 | A | | 9/1995 | Okamoto |
| 5,905,725 | A | * | 5/1999 | Sindhu et al. ............... 370/389 |
| 6,598,132 | B1 | * | 7/2003 | Tran et al. ................... 711/154 |
| 6,757,791 | B1 | * | 6/2004 | O'Grady et al. ............ 711/154 |

FOREIGN PATENT DOCUMENTS

| JP | 5-233854 A | 9/1993 |
| JP | 9-114664 A | 5/1997 |

* cited by examiner

*Primary Examiner*—Brian R. Peugh
*Assistant Examiner*—Jesse Diller
(74) *Attorney, Agent, or Firm*—Birch, Stewart, Kolasch & Birch, LLP

(57) ABSTRACT

An address calculation unit calculates a plurality of addresses corresponding to a plurality of data included in a data packet. A first bank memory access unit accesses a first bank memory according to a first address calculated by the address calculation unit. Simultaneously, a second bank memory access unit accesses a second bank memory according to a second address calculated by the address calculation unit. A packet reconstruction unit reconstructs the data packet according to the results of access by the first and second bank memory access units. Accordingly the processing rate of the data packet including a plurality of data is increased.

16 Claims, 7 Drawing Sheets

MEMORY ACCESS INFORMATION = 0

FIG.6B  MEMORY ACCESS INFORMATION = 1

FIG.6C  MEMORY ACCESS INFORMATION = 2

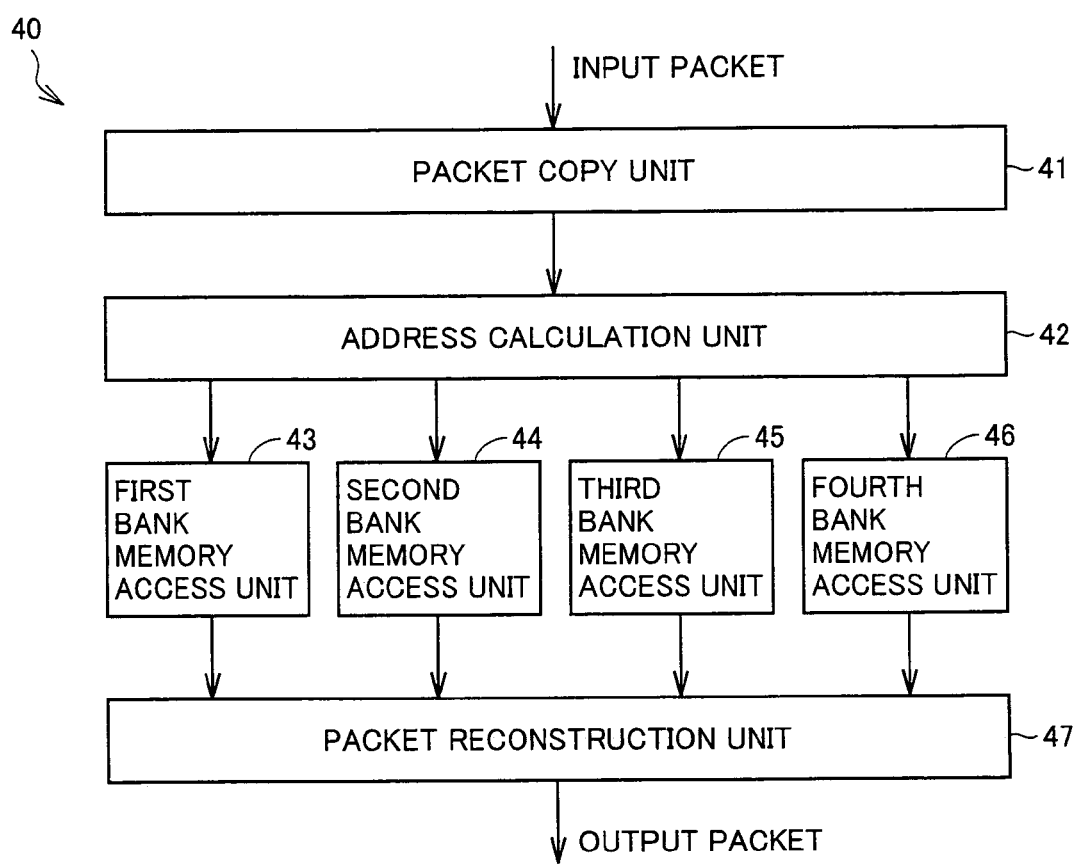

US 7,133,959 B2

DATA-DRIVEN INFORMATION PROCESSING DEVICE AND METHOD TO ACCESS MULTIPLE BANK MEMORIES ACCORDING TO MULTIPLE ADDRESSES

This nonprovisional application claims priority under 35 U.S.C. § 119(a) on Patent Application No. 2001-387194 filed in JAPAN on Dec. 20, 2001, which is herein incorporated by reference.

BACKGROUND OF THE INVENTION

1. Field of the Invention

The present invention relates to a data-driven information processing device. In particular, the present invention relates to data-driven information processing device and method with an improved processing rate for a data packet including a plurality of data.

2. Description of the Background Art

In recent years, there has been a growing demand for improvement of the performance of a processor in various fields like the fields of multimedia processing and high-definition image processing, for example, which require fast processing of a large volume of data. With the current LSI (large-scale integrated circuit) manufacturing technique, however, there is a limit to the increase of the speed of devices. Attention is then focused on parallel processing that is now studied and developed seriously.

Attention is drawn to computer architectures applied to parallel processing, in particular, to data-driven architecture. According to the data-driven processing architecture, parallel processing is carried out following a rule "if all of the input data necessary for certain processing are ready and such resources as operation unit required for the processing are allocated, that processing is executed."

The applicant of the present application discloses in Japanese Patent Laying-Open No. 9-114664 a data-driven information processing device processing a data packet including a plurality of data. FIG. 1 shows a structure of a data packet processed by this conventional data-driven information processing device. The data packet includes a tag section 101 and a data section 102. Tag section 101 includes destination information 103 indicating a node number in a program, instruction information 104 indicating any type of arithmetic operation to be performed on a plurality of data included in data section 102, and effective data information 105 indicating which of the multiple data included in data section 102 is effective. Data section 102 includes data 0 (106) and data 1 (107).

FIG. 2 is a block diagram schematically showing a configuration of a data-driven processor processing the data packet as shown in FIG. 1. The data-driven processor includes a junction unit 201, a firing control unit 202, a memory control unit 203, an operation unit 204, a program storage unit 205 and a branch unit 206. A plurality of data-driven processors of this type are connected in parallel to constitute a data-driven information processing device.

Junction unit 201 conducts arbitration of input between a data packet supplied from an input control unit (not shown) and a data packet supplied from branch unit 206 to provide these data packets to firing control unit 202 by arranging the data packets in order so as not to cause conflict therebetween.

For each data slot in the supplied data packet, firing control unit 202 determines whether or not there is an address for data to be subjected to operation (address at which the data to be subjected to operation is stored) in a queuing memory (not shown). If the supplied data packet and for each slot the address of data to be subjected to operation are present in the queuing memory, firing control unit 202 generates a data packet as shown in FIG. 1 from these data addresses and outputs the generated data packet to memory control unit 203. If the supplied data packet and any of the addresses for the data to be subjected to operation (address at which the data to be subjected to operation is stored) are absent in the queuing memory, firing control unit 202 stores the data in the queuing memory to wait for data addresses.

If data 0 (106) and data 1 (107) indicate respective addresses in a table memory (not shown), memory control unit 203 accesses the table memory to obtain the data values to be subjected to operation and generate a data packet including the data values.

Operation unit 204 refers to instruction information 104 to perform such operation as multiplication and addition on the data included in the data packet generated by firing control unit 202 or memory control unit 203 and provides the result of the operation to program storage unit 205.

Program storage unit 205 receives the result of the operation from operation unit 204 to generate a data packet having exchanged destination information 103 necessary for fetch of a next instruction and instruction information 104 and output the generated data packet to branch unit 206.

Branch unit 206 refers to destination information 103 in the data packet supplied from program storage unit 205 and, if branch unit 206 determines that the data should be processed in its own data-driven processor, branch unit 206 outputs the data packet to junction unit 201. If branch unit 206 determines that the data should not be processed in the own data-driven processor, branch unit 206 provides the data packet to another data-driven processor.

FIG. 3 is a block diagram showing details of memory control unit 203 in FIG. 2. Memory control unit 203 includes a packet copy unit 301, an address calculation unit 302, a memory access unit 303 and a packet reconstruction unit 304.

If the data included in the data packet indicate addresses in the table memory, packet copy unit 301 refers to effective data information 105 to determine if data 0 (106) and data 1 (107) are effective. If the two data in data section 102 are effective, packet copy unit 301 copies the data packet to generate a first packet for data 0 (106) and a second packet for data 1 (107).

Address calculation unit 302 refers to data 0 (106) included in the first packet to perform address calculation. Memory access unit 303 accesses the table memory according to the address calculated by address calculation unit 302 to obtain data corresponding to the first packet.

Similarly, address calculation unit 302 refers to data 1 (107) included in the second packet to perform address calculation. Memory access unit 303 accesses the table memory according to the address calculated by address calculation unit 302 to obtain data corresponding to the second packet.

Packet reconstruction unit 304 generates a new data packet by incorporating therein these two data obtained by memory access unit 303. For example, packet reconstruction unit 304 writes the obtained data corresponding to the first packet in a data region of data 0 in the first packet, and writes the obtained data corresponding to the second packet in a data region of data 1 to generate the new data packet.

As for the conventional data-driven information processing device as discussed above, if two data included in the data packet indicate address information of the table memory, memory access unit 303 accesses the table memory according to the address information for each data, resulting in a problem that two cycles are required and the throughput of the entire data-driven information processing device is accordingly decreased. This problem becomes serious as the number of data included in the data packet increases. Moreover, a similar problem occurs when memory access unit 303 writes the data stored in the data packet into the table memory.

SUMMARY OF THE INVENTION

One object of the present invention is to provide data-driven information processing device and method to improve processing rate for a data packet including a plurality of data.

Another object of the present invention is to provide versatile data-driven information processing device and method for accessing bank memories by changing an access method depending on the type of a program to be processed.

According to one aspect of the present invention, a data-driven information processing device processing a data packet including a plurality of data includes a plurality of bank memories, an address calculation unit calculating a plurality of addresses corresponding respectively to a plurality of data included in the data packet, an access unit accessing the bank memories according to the addresses calculated by the address calculation unit, and a reconstruction unit reconstructing the data packet according to the result of the access by the access unit.

The access unit accesses a plurality of bank memories according to a plurality of addresses calculated by the address calculation unit. Accordingly, the processing rate for the data packet including a plurality of data is increased.

According to another aspect of the present invention, a method of processing a data packet including a plurality of data by a data-driven information processing device includes the steps of calculating a plurality of addresses corresponding respectively to those plurality of data included in the data packet, accessing a plurality of bank memories according to the calculated addresses, and reconstructing the data packet according to the result of the access.

As a plurality of bank memories are accessed according to a plurality of calculated addresses, the processing rate for the data packet including a plurality of data is increased.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A–6C show respective structures of bank memories according to the second embodiment of the present invention.

FIG. 7 is a block diagram showing a configuration of a memory access control unit 40 according to the second embodiment of the present invention.

DESCRIPTION OF THE PREFERRED EMBODIMENTS

First Embodiment

Figure 2:
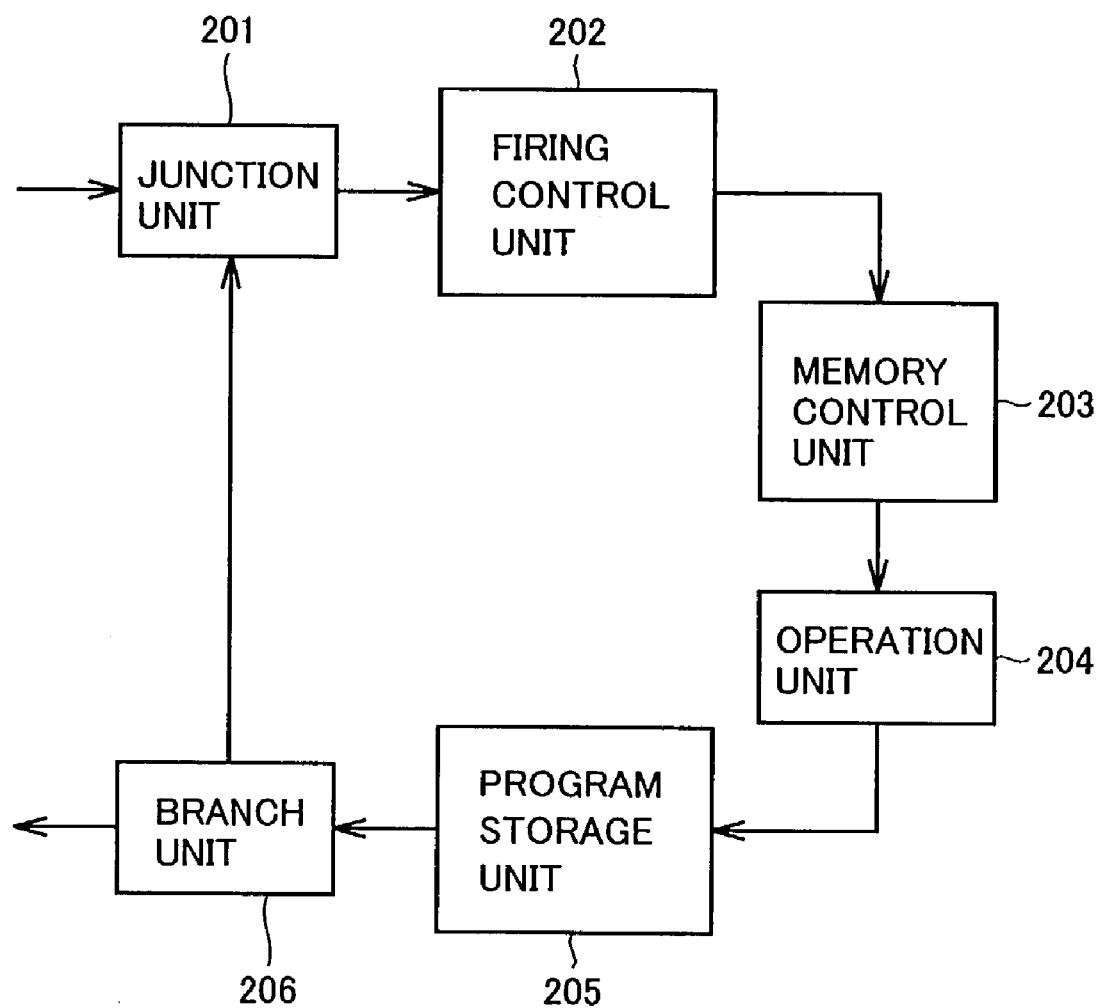
FIG. 2 is a block diagram schematically showing a configuration of a data-driven processor processing the data packet shown in FIG. 1.
Figure 3:
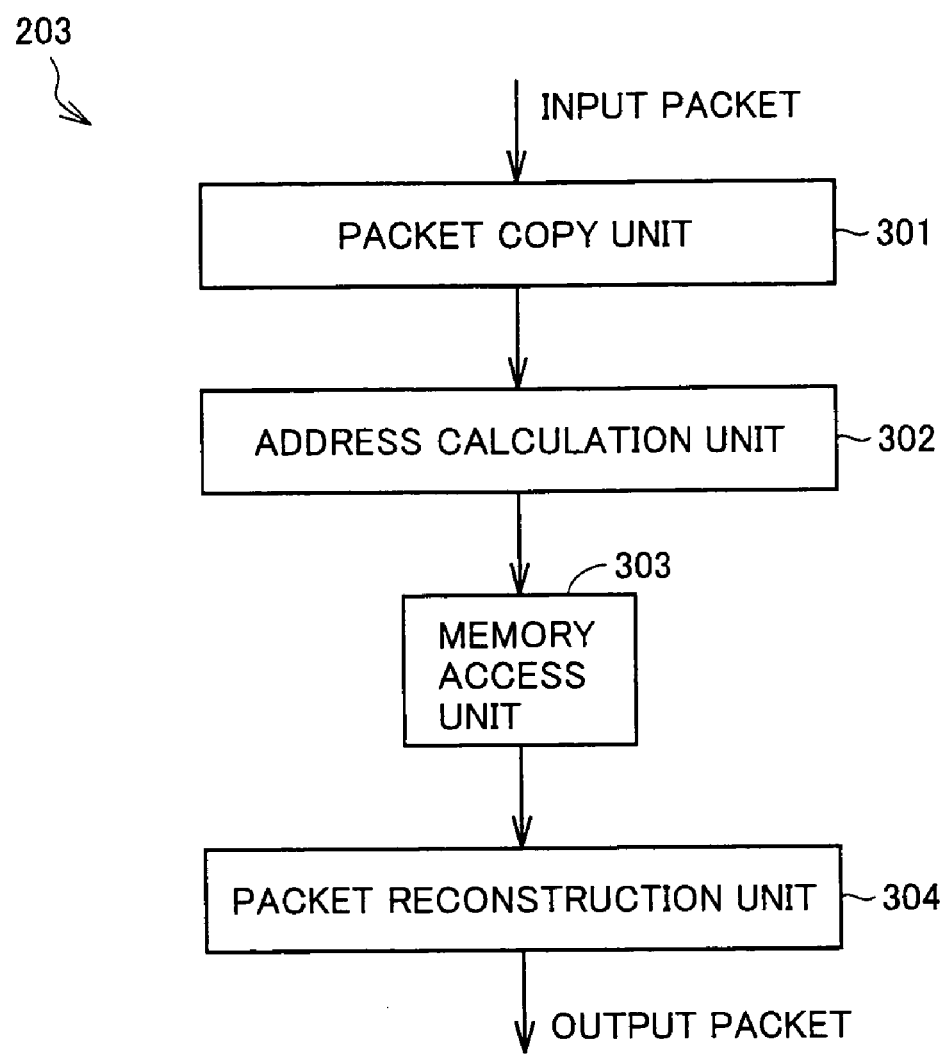
FIG. 3 is a block diagram showing details of a memory control unit 203 shown in FIG. 2.

A data-driven processor according to a first embodiment of the present invention has its general configuration differing from that of the conventional data-driven processor shown in FIG. 2 only in the configuration and function of the memory access control unit. Detailed description of the configurations and functions common to these processors is not repeated here. It is noted that a memory access control unit of this embodiment is denoted by reference numeral 10 and accordingly described.

Figure 1:
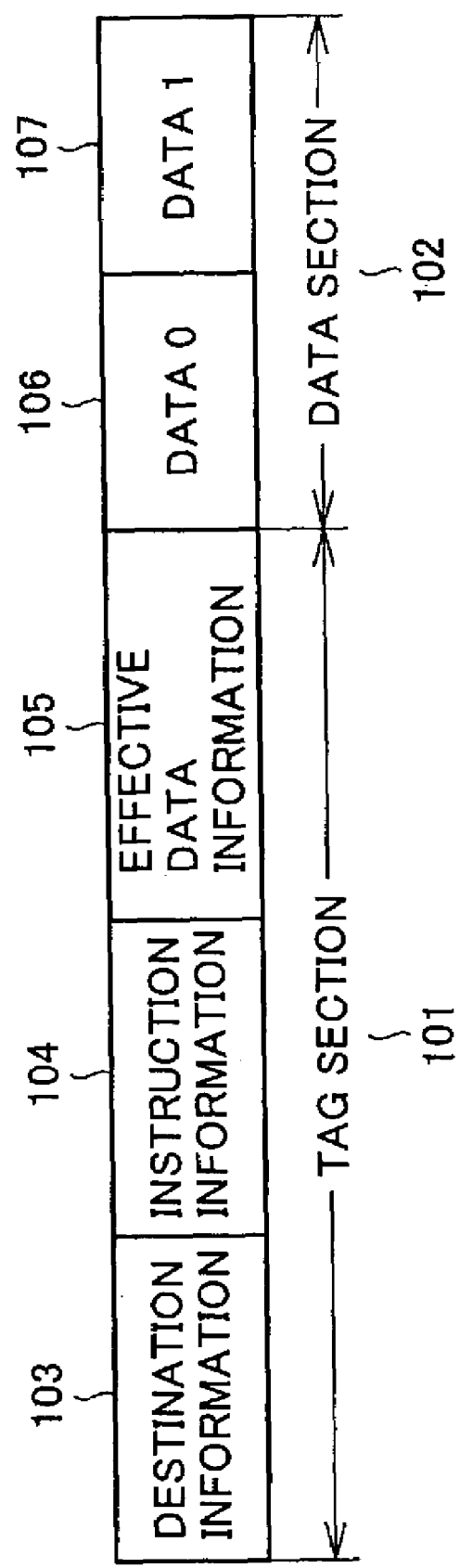
FIG. 1 shows a structure of a data packet processed by a conventional data-driven information processing device.

In addition, a data packet processed by a data-driven information processing device according to the first embodiment of the present invention has its structure similar to that of the data packet processed by the conventional data-driven information processing device shown in FIG. 1, and detailed description thereof is not repeated here.

Figure 4:
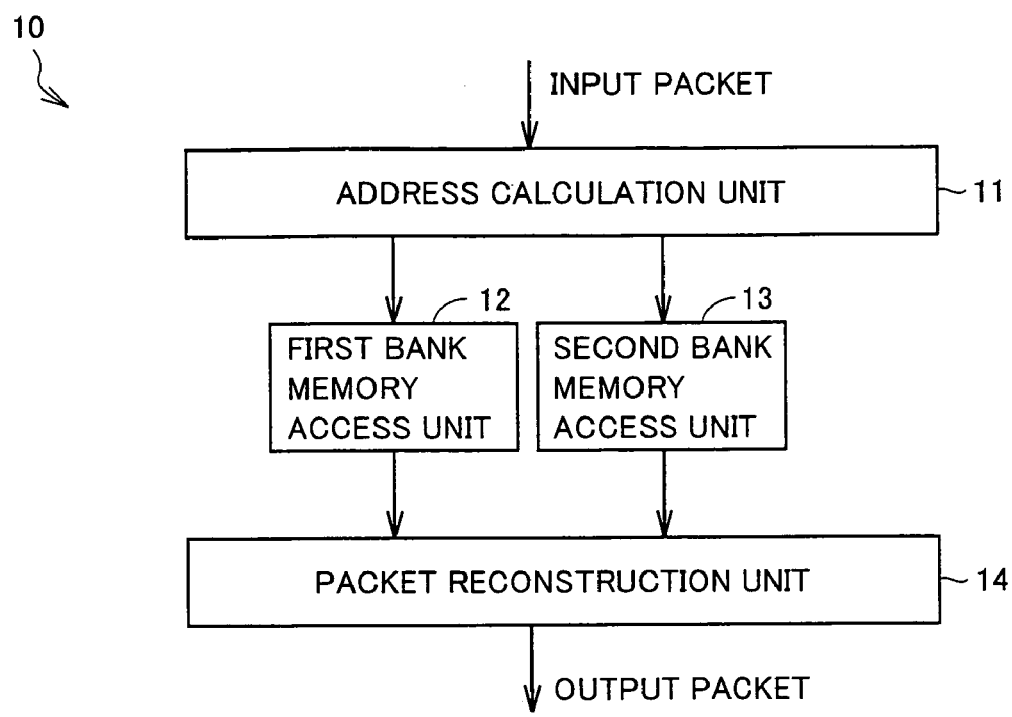
FIG. 4 is a block diagram showing a configuration of a memory access control unit 10 according to a first embodiment of the present invention.

FIG. 4 is a block diagram showing a configuration of memory access control unit 10 according to the first embodiment of the present invention. Memory access control unit 10 includes an address calculation unit 11, a first bank memory access unit 12, a second bank memory access unit 13 and a packet reconstruction unit 14.

The first bank memory access unit 12 is connected to a first bank memory (not shown) to access the first bank memory according to an address supplied from address calculation unit 11. The first bank memory has a data width of 16 bits and is constituted of 128 words.

The second bank memory access unit 13 is connected to a second bank memory (not shown) to access the second bank memory according to an address supplied from address calculation unit 11. The second bank memory has a data width of 16 bits and is constituted of 128 words.

Address calculation unit 11 receives a data packet as shown in FIG. 1 to calculate respective addresses of data to be accessed with reference to data 0 (106) and data 1 (107). The addresses of the data are respectively calculated according to the following expressions where "&" represents a logical product or AND, and "+" represents a logical sum or OR.

$$\text{address of data 0} = \text{data 0 \& mask value} \quad (1)$$

$$\text{address of data 1} = (\text{data 1 \& mask value}) + \text{offset value} \quad (2)$$

The mask value masks upper bits (bit 7–bit 15) of the address and is 0x007F. The logical product of data 0 or data 1 and the mask value is determined to indicate an address within one bank memory. Here, "0x" indicates that numerals following this symbol are represented in hexadecimal notation.

The offset value indicates the size of one bank memory and is 0x80. In calculation of the address of data 1, the offset value is added to allow the second bank memory access unit 13 to access the second bank memory without fail. As no offset value is added to the address of data 0, the first bank memory access unit 12 accesses the first bank memory without fail.

Address calculation unit 11 outputs the determined addresses respectively of data 0 and data 1 simultaneously to the first bank memory access unit 12 and the second bank memory access unit 13. According to respective addresses of data 0 and data 1, the first bank memory access unit 12 and the second bank memory access unit 13 simultaneously access the first and second bank memories respectively.

Packet reconstruction unit 14 stores the result of access by the first bank memory access unit 12 in the field of data 0 (106) of the data packet shown in FIG. 1 and stores the result of access by the second bank memory access unit 13 in the field of data 1 (107) of the data packet shown in FIG. 1. In this way, one reconstructed data packet is output from packet reconstruction unit 14.

For example, the first bank memory and the second bank memory may be used as look-up tables. The first and second bank memories are initialized to include exactly the same contents, and the first and second bank memories are used for determining value Y from value X as indicated by the following expression.

$$Y = \text{function}(X) \quad (3)$$

Value X ranges from 0x00 to 0x7F. According to value X stored in the fields of data 0 (106) and data 1 (107) of the data packet shown in FIG. 1, value Y is read from each of the first and second bank memories. Memory access control unit 10 thus obtains two Y values simultaneously in one cycle.

The first and second bank memories may be used as counters. In this case, values written into the first and second bank memories are all initialized to 0. Specifically, if the first and second bank memories each have a capacity of 128 words, the memories function each as a maximum of 128 counters. Respective count values are all initialized to 0.

If instruction information 104 included in the data packet shows that the count value should be incremented, the first bank memory access unit 12 and the second bank memory access unit 13 read respective values from the first bank memory and the second bank memory according to the address of data 0 and the address of data 1, and then increment the read values by 1 and write the values at the same addresses in the first bank memory and the second bank memory. This process is indicated by the following expression, where X represents the value (address) of data 0 or of data 1.

$$\text{table}(X) = \text{table}(X) + 1 \quad (4)$$

When the count-up is completed, the count value of the address in the first bank memory and the count value of the address in the second bank memory corresponding to the relevant counters are added together to generate a value of the counters. The counters are used for calculation of the number of times operation is performed in the data-driven information processing device or the number of times the data packet is cycled, for example.

As the first bank memory access unit 12 and the second bank memory access unit 13 thus simultaneously access the first and second bank memories respectively, the two counter values are incremented in one cycle and thus the processing rate of the data-driven information processing device is improved.

The data-driven information processing device of this embodiment has been described as having two bank memories. The data-driven information processing device may also be implemented by being provided with three or more bank memories.

As discussed above, in the data-driven information processing device of the first embodiment of the present invention, the first bank memory access unit 12 and the second bank memory access unit 13 access respective bank memories different from each other according to data 0 (106) and data 1 (107) in the data packet. Accordingly, access to multiple addresses in one cycle is possible, which improves the throughput of the entire data-driven information processing device and increase the processing rate.

Second Embodiment

A data-driven processor according to a second embodiment of the present invention has its general configuration differing from that of the conventional data-driven processor shown in FIG. 2 only in the configuration and function of the memory access control unit. Detailed description of the configurations and functions common to these processors is not repeated here. It is noted that a memory access control unit of this embodiment is denoted by reference numeral 40 and accordingly described.

The data-driven information processing device of the first embodiment accesses a plurality of addresses (data 0, data 1) included in the data packet in one cycle to increase the processing rate. Although the processing rate is improved, it is required to store the same contents in a plurality of bank memories and accordingly the bank memories used here must have a greater capacity.

The data-driven information processing device is applicable to various uses by changing a program to be executed and thus may be used for an application requiring a high processing rate or for an application using many bank memories while a high processing rate is unnecessary. The data-driven information processing device of this embodiment is applicable to these uses.

Figure 5:
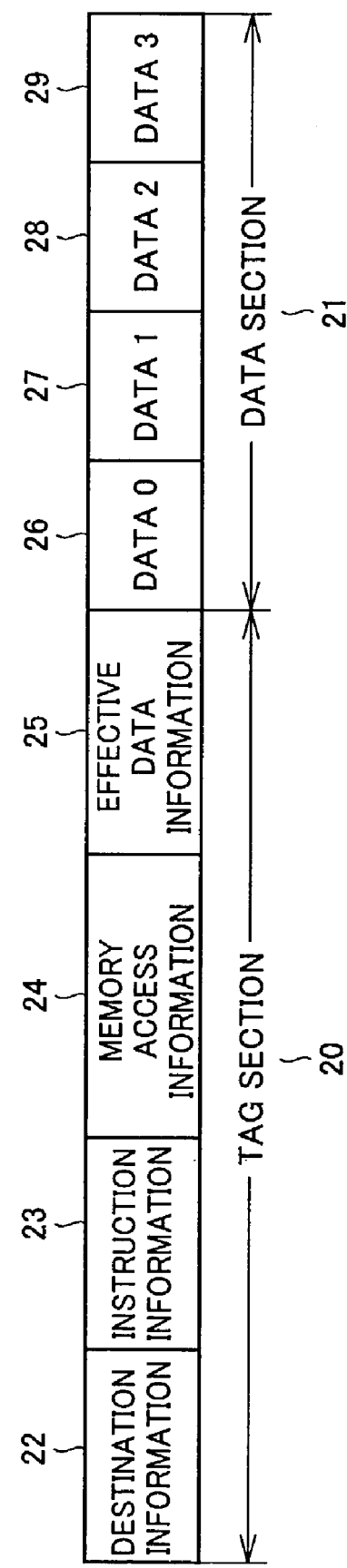
FIG. 5 shows a structure of a data packet processed by a data-driven information processing device according to a second embodiment of the present invention.

FIG. 5 schematically shows a structure of a data packet processed by the data-driven information processing device according to the second embodiment of the present invention. The data packet includes a tag section 20 and a data section 21. Tag section 20 includes destination information 22 indicating a node number in a program, instruction information 23 indicating the type of operation performed on a plurality of data included in data section 21, memory access information 24 indicating the way in which access is made to a bank memory as described hereinbelow, and effective data information 25 indicating which of the data included in data section 21 is effective. The field in which memory access information 24 is stored may be allocated to a predetermined register instead of tag section 20.

Data section 21 includes data 0 (26), data 1 (27), data 2 (28) and data 3 (29). In this embodiment, data 0–data 3 (26–29) each have a data width of 16 bits.

Figure 6A:
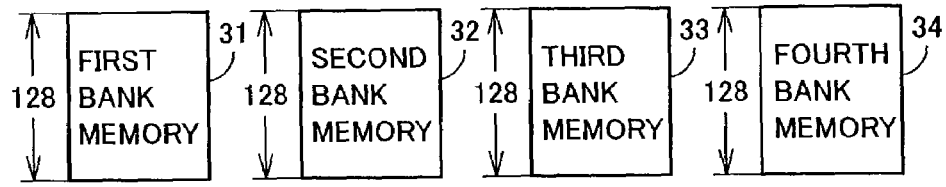
Figure 6A:
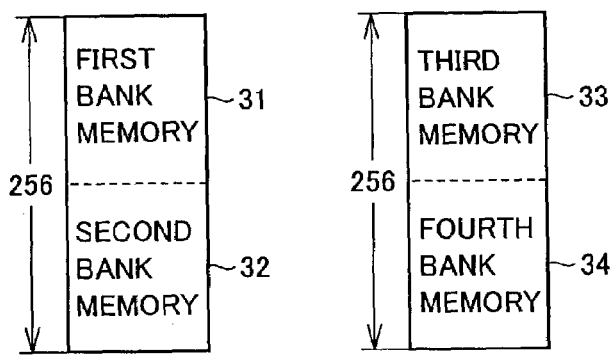
Figure 6A:
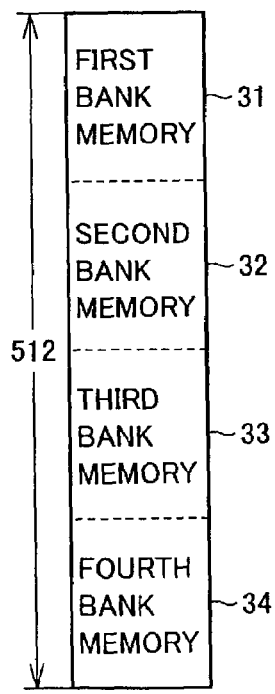

FIGS. 6A–6C each show a structure of bank memories according to the second embodiment of the present invention. A first bank memory 31, a second bank memory 32, a third bank memory 33 and a fourth bank memory 34 each have a data width of 16 bits and is constituted of 128 words.

FIG. 6A shows a structure of the bank memories when memory access information 24 shown in FIG. 5 indicates "0." When memory access information 24 is "0," memory access control unit 40 simultaneously accesses first bank memory 31–fourth bank memory 34 to obtain 4 words (16 bits×4) of data at a time.

FIG. 6B shows a structure of the bank memories when memory access information 24 shown in FIG. 5 indicates "1." When memory access information 24 is "1," memory access control unit 40 regards the first and second bank memories 31 and 32 as one bank memory and regards the third and fourth bank memories 33 and 34 as one bank memory. In other words, the first and second bank memories 31 and 32 are regarded as one bank memory having a 16-bit data width and storing 256-word data. Similarly, the third and fourth bank memories 33 and 34 are regarded as one bank memory having a 16-bit data width and stores 256-word data. Memory access control unit 40 thus simultaneously accesses two of the first to fourth bank memories 31–34 to obtain 2-word (16 bits×2) data at a time.

FIG. 6C shows a structure of the bank memories when memory access information 24 shown in FIG. 5 indicates "2." When memory access information 24 is "2," memory access control unit 40 regards the first to fourth bank memories 31–34 as one bank memory. In other words, the first to fourth bank memories 31–34 are regarded as one bank memory having a 16-bit data width and stores 512-word data. Then, memory access control unit 40 accesses one of the first to fourth bank memories 31–34 to obtain one word (16 bits) data.

Memory access information 24 thus indicates the number of bank memories that are simultaneously accessed by memory access control unit 40 as well as the number of data packets to be copied and output as described hereinbelow.

FIG. 7 is a block diagram showing a configuration of memory access control unit 40 according to the second embodiment of the present invention. Memory access control unit 40 includes a packet copy unit 41, an address calculation unit 42, a first bank memory access unit 43, a second bank memory access unit 44, a third bank memory access unit 45, a fourth bank memory access unit 46 and a packet reconstruction unit 47.

The first bank memory access unit 43 is connected to the first bank memory 31 shown in FIGS. 6A–6C to access the first bank memory 31 according to an address supplied from address calculation unit 42. The second bank memory access unit 44 is connected to the second bank memory 32 shown in FIGS. 6A–6C to access the second bank memory 32 according to an address supplied from address calculation unit 42.

The third bank memory access unit 45 is connected to the third bank memory 33 shown in FIGS. 6A–6C to access the third bank memory 33 according to an address supplied from address calculation unit 42. The fourth bank memory access unit 46 is connected to the fourth bank memory 34 shown in FIGS. 6A–6C to access the fourth bank memory 34 according to an address supplied from address calculation unit 42.

If packet copy unit 41 receives a data packet including memory access information 24 indicating "0," packet copy unit 41 does not copy the data packet. In this case, four addresses are accessed in one cycle.

If packet copy unit 41 receives a data packet including memory access information 24 indicating "1," packet copy unit 41 copies the data packet to generate two data packets. One of the two data packets has its data sections 21 storing data 0 and data 1 while the other of the two data packets has its data section 21 storing data 2 and data 3. These two data packets are supplied in order to address calculation unit 42. In this case, four addresses are accessed in two cycles.

If packet copy unit 41 receives a data packet including memory access information 24 indicating "2," packet copy unit 41 copies the data packet to produce four data packets. The four data packets have respective data sections 21 storing data 0–data 3 respectively. These four data packets are supplied in order to address calculation unit 42. In this case, four addresses are accessed in four cycles.

If memory access information 24 included in a received data packet is "0," address calculation unit 42 refers to data 0–data 3 (26–29) to calculate respective addresses of the data to be accessed. Respective addresses of the data are calculated by the following expressions.

$$\text{address of data } 0 = \text{data } 0 \ \& \ \text{mask value} \qquad (5)$$

$$\text{address of data } 1 = (\text{data } 1 \ \& \ \text{mask value}) + \text{offset value} \qquad (6)$$

$$\text{address of data } 2 = (\text{data } 2 \ \& \ \text{mask value}) + \text{offset value} \times 2 \qquad (7)$$

$$\text{address of data } 3 = (\text{data } 3 \ \& \ \text{mask value}) + \text{offset value} \times 3 \qquad (8)$$

The mask value masks upper bits (bit 7–bit 15) of the address and is 0x7F. The logical products of data 0–data 3 and the mask value are determined and accordingly an address within one bank memory is designated.

The offset value represents the size of one bank memory and is 0x80. In calculation of the addresses of data 1–data 3, the offset value is added to allow the second to fourth bank memories 32–34 to be accessed without fail. As no offset value is added to the address of data 0, the first bank memory 31 is accessed without fail.

If memory access information 24 included in a received data packet is "1," address calculation unit 42 refers to data 0 and data 1 (26, 27) included in the first data packet to calculate respective addresses of the data to be accessed. Respective addresses of the data are calculated by the following expressions.

$$\text{address of data } 0 = \text{data } 0 \ \& \ \text{mask value} \qquad (9)$$

$$\text{address of data } 1 = (\text{data } 1 \ \& \ \text{mask value}) + \text{offset value} \qquad (10)$$

The mask value masks upper bits (bit 8–bit 15) of the address and is 0x00FF. The logical products of data 0 and data 1 and the mask value are determined and thus an address within one bank memory is designated.

The offset value represents the size of one bank memory and is 0x100. In calculation of the address of data 1, the offset value is added to allow the third bank memory 33 or the fourth bank memory 34 to be accessed without fail. As no offset value is added to the address of data 0, the first bank memory 31 or the second bank memory 32 is accessed without fail.

If bit 7 of the address of data 0 calculated by expression (9) is "0," the first bank memory access unit 43 accesses the first bank memory 31. If bit 7 of the address of data 0 is "1," the second bank memory access unit 44 accesses the second bank memory 32.

If bit 7 of the address of data 1 calculated by expression (10) is "0," the third bank memory access unit 45 accesses the third bank memory 33. If bit 7 of the address of data 1 is "1," the fourth bank memory access unit 46 accesses the fourth bank memory 34.

Then, address calculation unit 42 refers to data 2 and data 3 (28, 29) included in the second data packet to calculate respective addresses of the data to be accessed. Respective addresses of the data are calculated by the following expressions.

$$\text{address of data } 2 = \text{data } 2 \ \& \ \text{mask value} \qquad (11)$$

$$\text{address of data } 3 = (\text{data } 3 \ \& \ \text{mask value}) + \text{offset value} \qquad (12)$$

The mask value is 0x00FF. The logical products of data 2 and data 3 and the mask value are determined to indicate an address within one bank memory. The offset value is 0x100. In calculation of the address of data 3, the offset value is added to allow the third bank memory 33 or the fourth bank memory 34 to be accessed without fail. As no offset value is added to the address of data 2, the first bank memory 31 or the second bank memory 32 is accessed without fail.

If bit 7 of the address of data 2 calculated by expression (11) is "0," the first bank memory access unit 43 accesses the first bank memory 31. If bit 7 of the address of data 2 is "1," the second bank memory access unit 44 accesses the second bank memory 32.

If bit 7 of the address of data 3 calculated by expression (12) is "0," the third bank memory access unit 45 accesses the third bank memory 33. If bit 7 of the address of data 3 is "1," the fourth bank memory access unit 46 accesses the fourth bank memory 34.

If address calculation unit 42 receives a data packet having memory access information 24 indicating "2," address calculation unit 42 refers to data 0 (26) included in the first data packet to calculate the address of the data to be accessed. The address of data 0 is calculated by the following expression.

$$\text{address of data 0} = \text{data 0 \& mask value} \quad (13)$$

The mask value masks upper bits (bit 9–bit 15) of the address and is 0x01FF. Here, no offset value is used.

If bit 7 and bit 8 of the address of data 0 calculated by expression (13) indicate "00," the first bank memory access unit 43 accesses the first bank memory 31. If bit 7 and bit 8 of the address of data 0 indicate "01," the second bank memory access unit 44 accesses the second bank memory 32. If bit 7 and bit 8 of the address of data 0 indicate "10," the third bank memory access unit 45 accesses the third bank memory 33. If bit 7 and bit 8 of the address of data 0 indicate "11," the fourth bank memory access unit 46 accesses the fourth bank memory 34.

Then, address calculation unit 42 refers to data 1 (27) included in the second data packet to calculate the address of the data to be accessed. The address of data 1 is calculated by the following expression. As done for data 0, according to bit 7 and bit 8 of the address of data 1, any of the first to fourth bank memory access units 43–46 accesses the corresponding bank memory.

$$\text{address of data 1} = \text{data 1 \& mask value} \quad (14)$$

Then, address calculation unit 42 refers to data 2 (28) included in the third data packet to calculate the address of the data to be accessed. The address of data 2 is calculated by the following expression. As done for data 0, according to bit 7 and bit 8 of the address of data 2, any of the first to fourth bank memory access units 43–46 accesses the corresponding bank memory.

$$\text{address of data 2} = \text{data 2 \& mask value} \quad (15)$$

Finally, address calculation unit 42 refers to data 3 (29) included in the fourth data packet to calculate the address of the data to be accessed. The address of data 3 is calculated by the following expression. As done for data 0, according to bit 7 and bit 8 of the address of data 3, any of the first to fourth bank memory access units 43–46 accesses the corresponding bank memory.

$$\text{address of data 3} = \text{data 3 \& mask value} \quad (16)$$

If packet reconstruction unit 47 receives a data packet having memory access information 24 of "0," four results of the access are directly incorporated in one data packet to be output.

If packet reconstruction unit 47 receives a data packet having memory access information 24 of "1," packet reconstruction unit 47 extracts the access results of data 0 (26) and data 1 (27) from the first data packet and extracts the access results of data 2 (28) and data 3 (29) from the second data packet to incorporate the access results in one data packet to be output.

If packet reconstruction unit 47 receives a data packet having memory access information 24 of "2," packet reconstruction unit 47 extracts the access result of data 0 (26) from the first data packet, the access result of data 1 (27) from the second data packet, the access result of data 2 (28) from the third data packet, and the access result of data 3 (29) from the fourth data packet to incorporate the access results in one data packet to be output.

As heretofore discussed, the data-driven information processing device according to this embodiment calculates the address by address calculation unit 42 changing the way to calculate the address depending on the value of memory access information 24. According to the calculated address, the first to fourth bank memory access units 43–46 access the bank memories. Depending on the type of program, the processing rate may be increased or the capacity of the bank memory used here may be increased. The versatile data-driven information processing apparatus is thus provided Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data-driven information processing device processing a data packet including a plurality of data, destination information, and instruction information, comprising:
   a plurality of bank memories of substantially equal size;
   an address calculation unit calculating a plurality of addresses respectively of said plurality of data included in said data packet, said calculating including adding an offset value, wherein said offset value is based on the size of one bank memory;
   an access unit accessing said plurality of bank memories according to said plurality of addresses calculated by said address calculation unit;
   a reconstruction unit reconstructing the data packet, including said instruction information, according to a result of access by said access unit; and
   an operation unit for performing an operation on the plurality of data based on the instruction information in the data packet, wherein
   said address calculation unit calculates n addresses corresponding respectively to n data included in said data packet, where n is an integer of at least 2, and
   said access unit simultaneously accesses n bank memories according to the n addresses calculated by said address calculation unit.

2. The data-driven information processing device according to claim 1, wherein
   data from the same data packet are stored respectively in said n bank memories.

3. The data-driven information processing device according to claim 1, wherein
   said n bank memories are look-up tables in which data from the same data packet are stored, and
   said access unit simultaneously obtains data corresponding to the n data included in said data packet from said n bank memories.

4. The data-driven information processing device according to claim 1, wherein if said data packet includes instruction information indicating that a counter value should be incremented, said access unit increments contents of said n bank memories according to the n addresses calculated by said address calculation unit.

5. The data-driven information processing device according to claim 1, wherein
said address calculation unit masks predetermined upper bits of said plurality of data included in said data packet to calculate said plurality of addresses.

6. The data-driven information processing device according to claim 1, wherein said data-driven information device has a plurality of data-driven processors connected in parallel, and each data-driven processor comprises said plurality of bank memories, said address calculation unit, said access unit, and said reconstruction unit.

7. The data-driven information processing device according to claim 1, wherein said data packet includes instruction information, said data-driven information processing device further comprising an operation processing unit arranged at an output of said reconstruction unit for executing said instruction on said plurality of data.

8. A data-driven information processing device processing a data packet including a plurality of data, comprising:
a plurality of bank memories;
an address calculation unit calculating a plurality of addresses respectively of said plurality of data included in said data packet;
an access unit accessing said plurality of bank memories according to said plurality of addresses calculated by said address calculation unit; and
a reconstruction unit reconstructing the data packet according to a result of access by said access unit, wherein
said data packet includes memory access information indicating the number of bank memories to be accessed simultaneously, and
said access unit refers to said memory access information to determine the number of bank memories to be accessed simultaneously and accesses said plurality of bank memories according to said plurality of addresses calculated by said address calculation unit.

9. The data-driven information processing device according to claim 8, further comprising a packet copy unit copying said data packet, wherein
when said memory access information indicates that m bank memories should be accessed simultaneously, said packet copy unit copies said data packet to output n/m data packets, where in is an integer of at least 1 and n is an integer of at least 2,
said access unit regards n bank memories as m bank memories to access said m bank memories simultaneously, corresponding to said n/m data packets, and
said reconstruction unit reconstructs the data packet according to a result of the access by said access unit that corresponds to said n/m data packets.

10. A method of processing a data packet including a plurality of data, destination information, and instruction information, by a data-driven information processing device, comprising the steps of:
calculating a plurality of addresses corresponding respectively to said plurality of data included in said data packet, said calculating including adding an offset value, wherein said offset value is the size of one bank memory of a plurality of bank memories;
accessing said plurality of bank memories according to said plurality of addresses that are calculated;
reconstructing the data packet, including said instruction information, according to a result of said access; and
performing an operation on the plurality of data based on the instruction information in the data packet, wherein
said step of calculating said plurality of addresses includes the step of calculating n addresses corresponding to n data included in said data packet, where n is an integer of at least 2, and
said step of accessing said plurality of bank memories includes the step of simultaneously accessing n bank memories according to said n addresses that are calculated.

11. The method of processing a data packet according to claim 10, further comprising the step of performing an operation on said plurality of data in said reconstructed data packet based on an instruction in said reconstructed data packet, thereby generating a resulting data packet.

12. A method of processing a data packet including a plurality of data by a data-driven information processing device, comprising the steps of:
calculating a plurality of addresses corresponding respectively to said plurality of data included in said data packet;
accessing a plurality of bank memories according to said plurality of addresses that are calculated; and
reconstructing the data packet according to a result of said access, wherein
said data packet includes memory access information indicating the number of bank memories to be accessed simultaneously,
said method further comprises the step of copying said data packet to output n/m data packets when said memory access information indicates that in bank memories should be accessed simultaneously, where m is an integer of at least 1 and n is an integer of at least 2,
said step of accessing said plurality of bank memories includes the step of regarding n bank memories as m bank memories to access said m bank memories simultaneously, corresponding to said n/m data packets, and
said step of reconstructing the data packet includes the step of reconstructing the data packet according to a result of the access corresponding to said n/m data packets.

13. A data-driven information processing device processing a data packet including a plurality of operands, destination information, and instruction information, comprising:
an address calculation unit calculating a plurality of absolute addresses corresponding to respective said plurality of operands included in said data packet;
a plurality of bank memories;
an access unit accessing said plurality of bank memories according to said plurality of absolute addresses calculated by said address calculation unit in order to retrieve data values for said respective operands;
a reconstruction unit reconstructing the data packet, including said data values and instruction information, according to a result of access by said access unit; and
an operation unit for performing an operation on the plurality of data values based on the instruction information in the data packet, wherein
said data packet includes memory access information indicating the number of bank memories to be accessed simultaneously, and
said access unit refers to said memory access information to determine the number of bank memories to be accessed simultaneously and accesses said plurality of bank memories according to said plurality of addresses calculated by said address calculation unit.

14. The data-driven information processing device according to claim 13, wherein said address calculation unit calculates n absolute addresses corresponding respectively to n operands included in said data packet, where n is an integer of at least 2, and said access unit simultaneously accesses n bank memories according to the n absolute addresses calculated by said address calculation unit.

15. The data-driven information processing device according to claim 14, wherein if said data packet includes instruction information indicating that a counter value should be incremented, said access unit increments contents of said n bank memories according to the n addresses calculated by said address calculation unit.

16. The data-driven information processing device according to claim 13, further comprising a packet copy unit copying said data packet, wherein when said memory access information indicates that m bank memories should be accessed simultaneously, said packet copy unit copies said data packet to output n/m data packets, where m is an integer of at least 1 and n is an integer of at least 2, said access unit regards n bank memories as m bank memories to access said m bank memories simultaneously, corresponding to said n/m data packets, and said reconstruction unit reconstructs the data packet according to a result of the access by said access unit that corresponds to said n/m data packets.

* * * * *

UNITED STATES PATENT AND TRADEMARK OFFICE
CERTIFICATE OF CORRECTION

| | | |
|---|---|---|
| PATENT NO. | : 7,133,959 B2 | Page 1 of 1 |
| APPLICATION NO. | : 10/320555 | |
| DATED | : November 7, 2006 | |
| INVENTOR(S) | : Kouichi Hatakeyama et al. | |

It is certified that error appears in the above-identified patent and that said Letters Patent is hereby corrected as shown below:

At Column 11, line 49 in claim 9 "where in is"

should read:

At Column 11, line 49, claim 9 -- where m is --

At Column 12, line 33 in claim 12 "that in bank"

should read:

At Column 12, line 33 in claim 12 -- that m bank --

Signed and Sealed this

First Day of May, 2007

JON W. DUDAS
*Director of the United States Patent and Trademark Office*